(12) United States Patent
Papageorgiou et al.

(10) Patent No.: US 11,010,144 B2
(45) Date of Patent: May 18, 2021

(54) SYSTEM AND METHOD FOR RUNTIME ADAPTABLE APPLICATIONS

(71) Applicant: NEC Laboratories Europe GmbH, Heidelberg (DE)

(72) Inventors: Apostolos Papageorgiou, Heidelberg (DE); Jonathan Fuerst, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/003,146

(22) Filed: Jun. 8, 2018

(65) Prior Publication Data
US 2019/0377560 A1    Dec. 12, 2019

(51) Int. Cl.
*G06F 8/41*    (2018.01)
*G06F 8/33*    (2018.01)
*G06F 8/36*    (2018.01)

(52) U.S. Cl.
CPC ............... *G06F 8/4443* (2013.01); *G06F 8/33* (2013.01); *G06F 8/36* (2013.01); *G06F 8/427* (2013.01)

(58) Field of Classification Search
CPC .......... G06F 8/20–78; G06F 8/33; G06F 8/36; G06F 8/427; G06F 8/4443
See application file for complete search history.

(56) References Cited

U.S. PATENT DOCUMENTS

| | | | | |
|---|---|---|---|---|
| 7,839,926 B1 * | 11/2010 | Metzger | ................. | H04N 5/144 375/240.01 |
| 8,224,672 B1 * | 7/2012 | Griffith | .................. | G06Q 40/08 705/4 |
| 9,727,317 B2 | 8/2017 | Gao et al. | | |
| 10,521,223 B1 * | 12/2019 | Bogushefsky, III | ...... | G06F 8/30 |
| 2016/0139915 A1 * | 5/2016 | Dimitrakos | ............... | G06F 8/61 717/126 |
| 2017/0212734 A1 * | 7/2017 | Noad | ........................ | G06F 8/36 |
| 2019/0108048 A1 * | 4/2019 | Chen | ................... | G06F 9/45558 |

OTHER PUBLICATIONS

Julien Bourgeois et al., Extending executability of applications on varied target platforms, IEEE, 2011, retrieved online on Dec. 16, 2020, pp. 253-260. Retrieved from the Internet: <URL: https://ieeexplore.ieee.org/stamp/stamp.jsp?tp=&arnumber=6063000>. (Year: 2011).*

Gregor Kiczales, et al., "Aspect-Oriented Programming", Magazine Communications of the ACM, vol. 44, issue 10, Oct. 2001, p. 313.

Anthony Canino, "Proactive and Adaptive Energy-Aware Programming with Mixed Typechecking", PLDI'17, Jun. 18-23, 2017, pp. 217-232.

* cited by examiner

*Primary Examiner* — Hanh Thi-Minh Bui
(74) *Attorney, Agent, or Firm* — Leydig, Voit & Mayer, Ltd.

(57) ABSTRACT

A platform host for deploying a runtime adaptable application has in-line application scope parameters and is capable of interacting with code selection logic when executed. The platform host includes one or more processors coupled to a non-transitory processor-readable storage medium having processor-executable instructions that, when executed by the processor, cause the platform host to: instantiate the code selection logic in an execution platform, the code selection logic being based, at least in part, on the in-line application scope parameters; determine values of platform configuration parameters at runtime, and execute the runtime adaptable application based on the code selection logic and the values of the platform configuration parameters.

17 Claims, 6 Drawing Sheets

SYSTEM AND METHOD FOR RUNTIME ADAPTABLE APPLICATIONS

FIELD

The present invention relates to a system and method for applications that are seamlessly adaptable at runtime.

BACKGROUND

The expansion of the Infrastructure-as-a-Service (IaaS) and Platform-as-a-Service (PaaS) models means that more and more software applications are executed on (usually large and distributed) computing clusters and/or execution environments that are operated by a third party. In such environments, it can be desirable that applications are able to adjust to different runtime states (e.g., with regard to available resources, identified bottlenecks, usage fluctuation, etc.).

Traditionally, this ability to adjust to different runtime states, hereinafter called "adaptability", is implemented by the software application developer as a set of conditional program flows that are determined by a set of states, which are a priori known to the application developer and can be changed at runtime (e.g., by an operator, a system monitor, an orchestrator, or any other application). The inventors have recognized that this developer coded adaptability is problematic. For example, the developers may not have full knowledge of potential runtime states (making their programs less adaptable and inefficient), and implementing adaptable code in such a manner requires complex coding.

In addition to the developer coded adaptability approach, other techniques have been considered for addressing application adaptability, but the inventors have recognized that these other approaches are also problematic.

For example, aspect-oriented programming (AOP) has been considered. AOP is based on cross-cutting concerns that are implemented as aspects (i.e., functions that are executed before, around, or after other functions). AOP theoretically could be employed to slightly lower the development complexity of adaptable software (e.g., by maintaining process flow code selection logic as an aspect that is injected before program parts that have multiple possible flows in order to set a selection variable). However, similar to the above approach, this would not eliminate the potentially very complex conditional statements of the application code. Additionally an AOP approach would also introduce the problem of having to explicitly code remote calls to the platform. For a further discussion of AOP, see Gregor Kiczales and Erik Hilsdale, "Aspect-oriented programming," Proceedings of the 8th European software engineering conference held jointly with 9th ACM SIGSOFT international symposium on foundations of software engineering (ESEC/FSE-9), 313 (ACM, New York, N.Y., USA, 2001), the entire contents of which are hereby incorporated by reference herein.

Runtime code replacement has also been considered. Runtime code replacement (e.g., hot code swapping such as jRebel and HotSpot VM, and just-in-time (JIT) compiler) refers to replacing or activating function implementations of running programs. However, runtime code replacement is complex and might only be a good fit when it is actually required to change the code during runtime. In typical adaptable solutions, the conditions can be evaluated by the same code.

New programming languages or extensions for mode-based programming (e.g., ENT), have also been considered for use to characterize the behavior of program fragments based on modes (e.g., in energy-saving mode do A, otherwise do B). However, they introduce too many language syntax changes and their extensions are not generic enough. For example, ENT is tailored to energy management and not focused on exporting the selection logic. For a further discussion on ENT, see Anthony Canino and Yu David Liu, "Proactive and adaptive energy-aware programming with mixed typechecking," Proceedings of the 38th ACM SIG-PLAN Conference on Programming Language Design and Implementation, 217-232 (ACM, New York, N.Y., USA, 2017), the entire contents of which are hereby incorporated by reference herein.

SUMMARY

According to an aspect of the invention, a platform host for deploying a runtime adaptable application is provided. The platform host may have in-line application scope parameters and be capable of interacting with code selection logic when executed. The platform host can include one or more processors coupled to a non-transitory processor-readable storage medium having processor-executable instructions that, when executed by the processor, cause the platform host to: instantiate the code selection logic in an execution platform, the code selection logic being based, at least in part, on the in-line application scope parameters; determine values of platform configuration parameters at runtime, and execute the runtime adaptable application based on the code selection logic and the values of the platform configuration parameters.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide methods for generating applications that can be seamlessly adapted at runtime. Embodiments can include multi-option functionalities and can be forced to execute at runtime those options that are selected by logic of the hosting execution environment. Embodiments also provide new programming syntax elements and annotations, as well as an engine that autogenerates code for the option selection logic; thus eliminating the need for an application developer to write option selection logic. The present invention thereby reduces development effort and enables more fine-grained runtime performance optimization by the application hosting platform as compared to other approaches.

Figure 1:
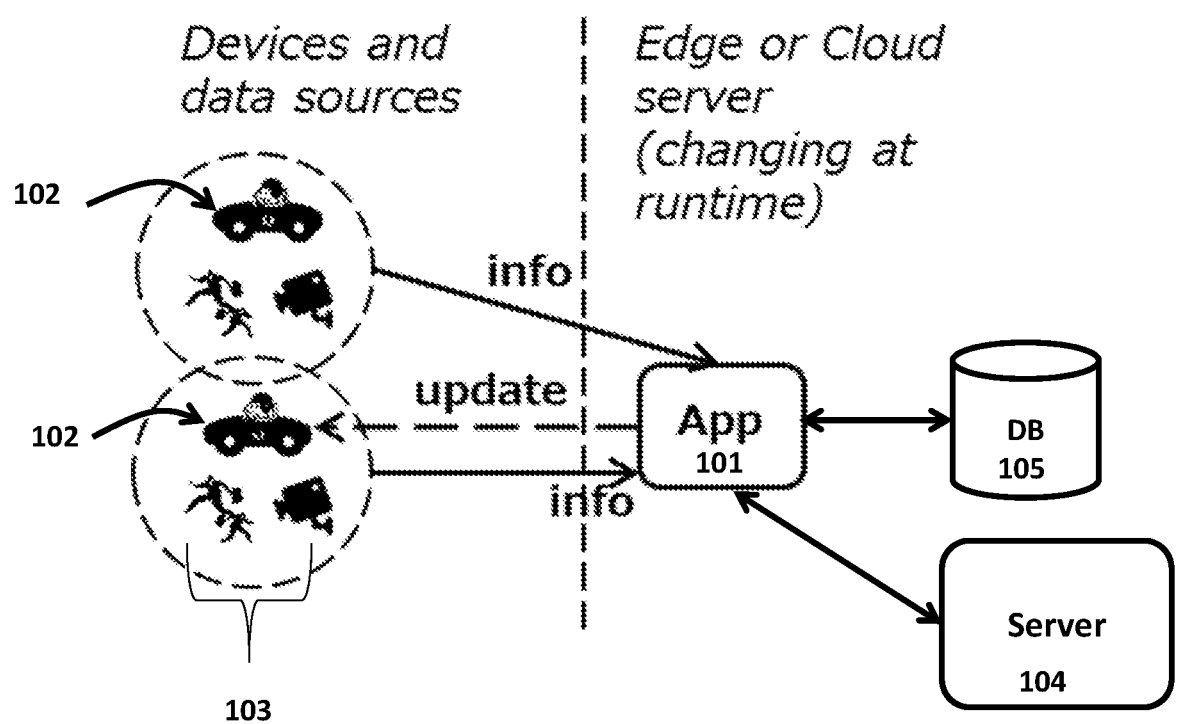
FIG. 1 illustrates an example environment for using an adaptable application.

To help illustrate aspects of embodiments of the present invention, consider FIG. 1, which shows an example application setting; however, it should be apparent that embodiments of the present invention are not limited to this exemplary setting. In the application setting 100, a software application 101 collects data from a vehicle 102 and its environment 103 (e.g., street cameras, pedestrian devices, etc.), performs some computation during which it might communicate with other servers 104 or databases 105, and potentially reacts by sending an update to the vehicle 102 (e.g., an updated advertisement to be projected on the vehicle, a self-driving action to perform, some content for the driver assistant, an entertainment system update, etc.).

Here, there can be a series of conditional program flows for the software application 101, as well as a series of (potentially unknown to the developer) external factors that might determine the most efficient combination of program flows. Furthermore, these associations might be completely different depending on where the application is running (which is also unknown to the application developer).

Table I includes a few examples of runtime state parameters and the implications that these state parameters could have, depending both on the PaaS system and the application itself.

TABLE I

Example runtime states and their possible implications:

| Runtime State | Possible Problem | Possible Adaptation |
| --- | --- | --- |
| CPU overload of server (actual or predicted). | Update sent too late to vehicle. | Use rule-based instead of artificial intelligence (AI)-based data processing. |
| Huge crowd in an area. | Certain algorithms become inefficient or too resource-consuming. | Deactivate video data and only use radio frequency (RF)-based crowd estimation. |
| AI accelerator (GPU or dedicated ASIC) not available on host. | CPU based computation is too slow to adhere to latency requirements. | Use "shallow" learning algorithm instead of deep learning to process video frames. |
| Limited bandwidth on wireless network link to street cameras due to interference. | Video frames arrive delayed and cannot be processed in time. | First request video resolution reduction. If this is not enough to keep latency requirements, use sub-sampling to reduce bandwidth usage further. |
| Memory on host is exhausted. | Application process becomes too slow due to exhaustive swapping to disk. | Less memory-intensive options are used for the currently used programs and algorithms |

Figure 2:
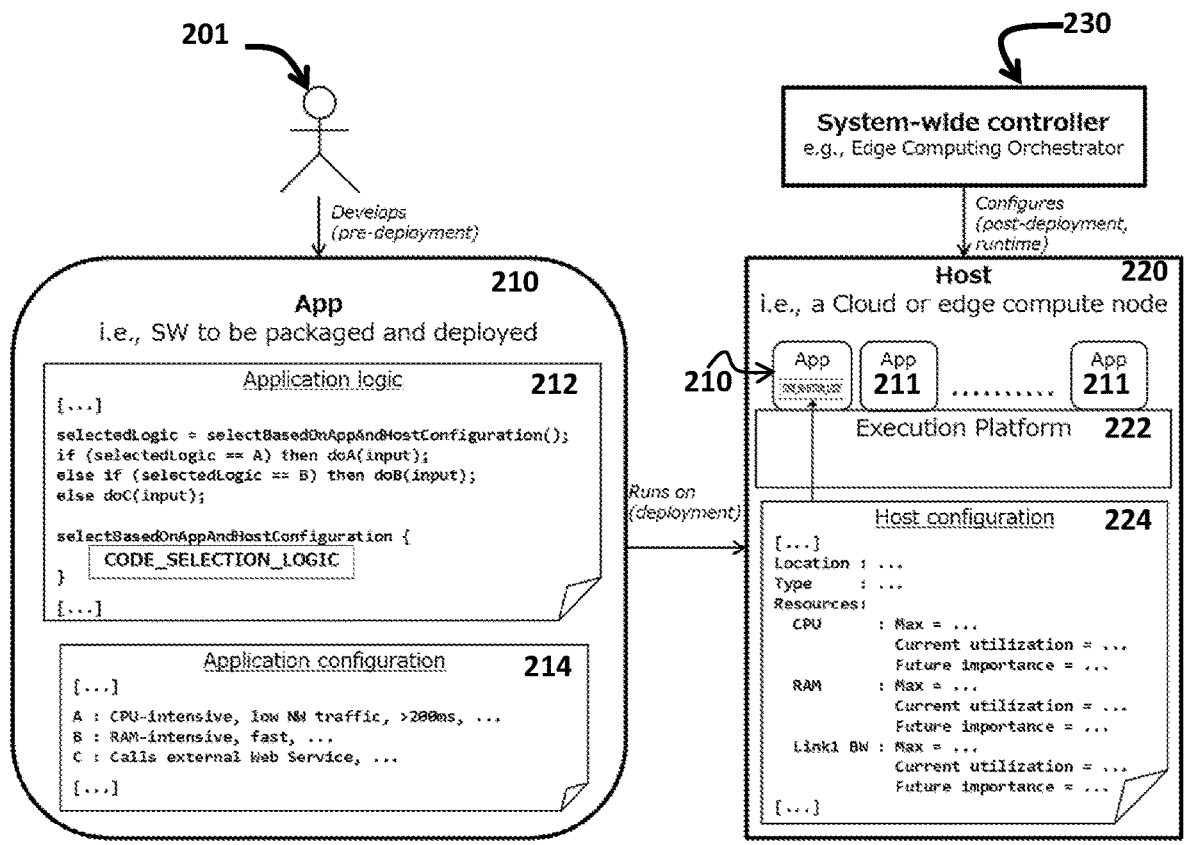
FIG. 2 illustrates a system and programming model for developing adaptable applications.

FIG. 2 illustrates a developer defined program flow programming model and the involved entities that enable adaptable applications. As will be described in more detail below, embodiments of the present invention provide advantages over the model and system shown in FIG. 2. FIG. 2 is provided to help illustrate some of the advantages provided by the present invention.

The developer defined system 200 of FIG. 2 is shown as a high-level representation that is independent of the programming language of the software application and independent of the PaaS technologies and deployment mechanisms. Here, a developer 201 develops (pre-deployment) an application 210, which can be software for packaging and deployment. The application 210 includes application logic 212 and application configuration 214, both of which can be developer defined.

The application 210 is designed to run on (be deployed at) a host 220. The host 220 can be, for example, a cloud or edge computer node. The host 220 can run other applications 211 as well as the application 210. The host 220 can include an execution platform 222 and host configuration 224. A system-wide controller 230 configures the host, which can occur post-deployment, at runtime. The system-wide controller 230 may be an edge computing orchestrator.

FIG. 2 highlights a single conditional program flow, for which three alternatives exist (doA, doB, and doC).

According to this model, configuration parameters, on which the choice of the program flow will depend, are defined in the scope of the application 210 and/or in the scope of the platform 222 (e.g., selectBasedOnAppAndHostConfiguration( )). For example, the developer may provide the application configuration 214 and the system-wide controller 230 may provide the host configuration as the configuration parameters. The combination of the values of these parameters correspond to different runtime states.

The application developer 201 prepares code selection logic (CODE_SELECTION_LOGIC), which defines how the program flow depends on the configuration parameters. Alternative program flows can be also parametrized (via the "input" argument), so that the value of "input" can also be affected by the CODE_SELECTION_LOGIC (i.e. practically leading to more than three alternatives in the example shown).

The application logic 212 is packaged together with its CODE_SELECTION_LOGIC as the application 210, and the application 210 is deployed on the host 220 (e.g., the host of the PaaS) for execution. The application 210 may also include the application configuration 214 as part of the package.

The host 220 (which deploys the application 210) and the values of the host configuration parameters 224 can change at runtime. Depending on the deployment and the state of the configuration parameters, the CODE_SELECTION_LOGIC can make different decisions, which can lead to different program flows each time the application 210 is executed.

Implementing highly adaptable software applications in the way described in connection with FIG. 2 is problematic. First, neither application developers nor operators (nor PaaS developers) have full knowledge of the runtime states and their implications (which is required for implementing an efficient CODE_SELECTION_LOGIC). Second, implementing adaptability is very complex for developers in terms of conditional program parts and required configurations.

Therefore, this model becomes inefficient and difficult to implement when the possible runtime states and their implications are complex or unknown to the software application developer. This, in turn, leads to software applications being implemented with either a low degree of adaptability or with wrong or inefficient logic for selecting among the possible program flows (or modes).

In contrast to the model of FIG. 2, embodiments of the present invention are efficient and more easily implemented when the possible runtime states and their implications are complex or unknown to the application developer. Embodiments are also highly adaptable and have efficient logic for selecting a program flow or mode. For example, the code written by the application developer to implement or support adaptability is made simple by not having to use (or eliminating) all conditional statements as well as all code parts that import and use configuration parameters.

Embodiments of the present invention provide selection logic (i.e., the logic that determines how the program flow and the runtime function parameters depend on runtime states) that is exported to the platform without the application developer having to know anything about this logic or any respective application programming interfaces (APIs) of the platform.

Figure 3:
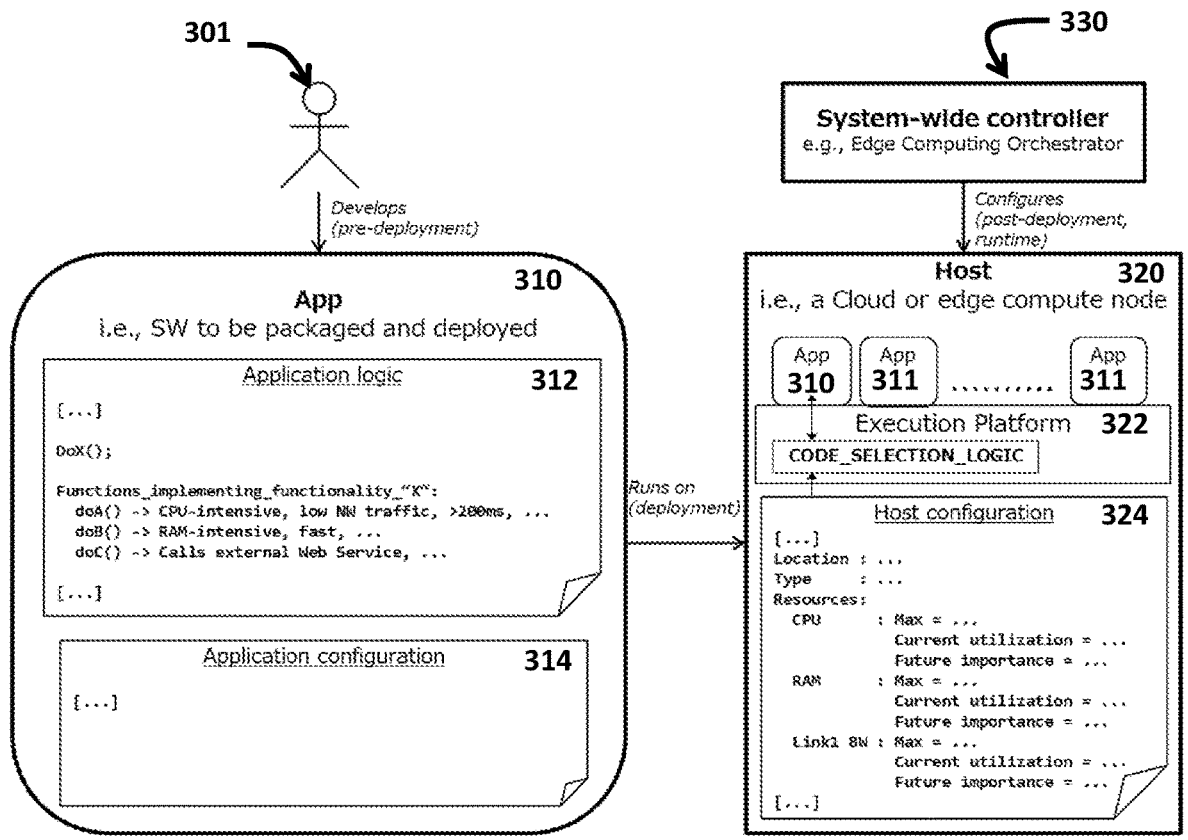
FIG. 3 illustrates a system and programming model for developing adaptable applications according to an embodiment.

FIG. 3 illustrates a system for developing and deploying adaptable applications according to an embodiment of the invention. The adaptable application system 300 of FIG. 3 is shown as a high-level representation that is independent of the programming language of the software application and independent of the PaaS technologies and deployment mechanisms.

The adaptable application system 300 of FIG. 3 includes a developer 301 that develops (pre-deployment) an adaptable application 310. The adaptable application 310 is a software application to be packaged and deployed. The adaptable application 310 can include application logic 312 and application configuration parameters 314; however, the application configuration parameters 314 need not be used in every embodiment.

The adaptable application system 300 also includes a host 320 and a system-wide controller 330. The system-wide controller 330 may be an edge computing orchestrator that configures (e.g., configures post-deployment) the host 320. The host 320 may be a cloud or edge computer node. The host 320 runs the adaptable application 310, and can run other applications 311. The host includes an execution platform 322 and host configuration parameters 324. The applications 310, 311 are executed on the execution platform 322.

In the adaptable application system 300, some configuration parameters on which the choice of the program flow will depend are defined in the scope of the platform (e.g., the particular execution platform 322 executing the adaptable application 310). In embodiments, the application-scope parameters are provided in-line next to the respective code parts. For example, as shown in FIG. 3, application-scope parameters are provided within the application logic 312 of the adaptable application 310.

The in-line application-scope parameters are based on syntax constructs or annotations. Annotations and syntax constructs can be used to code functions that have multiple options and to describe some criteria that will be used for the evaluation of the options at runtime. The introduction of programming syntax elements and annotations that allow for the definition and usage of multi-option functions in a way that the selection logic (for selecting among the options) is seamlessly exported from the application to the hosting platform. The use of annotations and syntax constructs of embodiments of the invention drastically simplifies the configuration-related program parts of the application. The combinations of the values of these parameters correspond with different runtime states.

A platform developer (which may be distinct from the application developer) provides code selection logic (CODE_SELECTION_LOGIC) that defines the way in which the program flow depends on the configuration parameters. The platform developer (and CODE_SELEC-TION_LOGIC) can exploit the in-line application developer hints (e.g., as inferred by the annotations and syntax constructs). The CODE_SELECTION_LOGIC is included in the execution platform 322 on the host 320.

In embodiments, the adaptable application 310 is packaged without any CODE_SELECTION_LOGIC and deployed on the host 320 (e.g., the host of the PaaS) for execution. The adaptable application 310 is able to interact with the CODE_SELECTION_LOGIC module in the execution platform 322 of the host 320. The CODE_SELECTION_LOGIC module can be pluggable and potentially different for every host.

The host of the application and the values of the platform configuration parameters can change at runtime, which causes the CODE_SELECTION_LOGIC to make different decisions and can lead to different program flows each time the adaptable application 311 is executed.

Alternative program flows can be also parametrized so that the value of the input of the alternative functions can also be set by the CODE_SELECTION_LOGIC (i.e. leading to additional alternative program flows). In embodiments, this parametrization can be also done by the platform logic (e.g., execution platform 322) based on the runtime states.

The example adaptable application 310 shown in FIG. 3 includes a single conditional program flow, for which three alternatives exist (doA, doB, and doC). However, as should be recognized, embodiments of the present invention are not restricted to this configuration. The developer 301 programs (pre-deployment) the adaptable application 310, including writing the application logic 312, which includes at least one function with alternatives that are conditionally executed based on runtime states. In the example of FIG. 3, the application logic 312 includes the function DoX( ) that has three alternative functions, doA( ), do(B), and doC( ), for use in implementing the functionality "X" base on runtime conditions.

For each of the three alternative functions, the developer 301 includes in-line application-scope parameters that are based on syntax constructs or annotations. As shown in FIG. 3, the developer 301 included, for example, in-line application-scope parameter "CPU-intensive, low NW traffic, >200 ms, . . . " with alternative function doA( ); "RAM-intensive, fast, . . . " with alternative function doB( ); and "Calls external Web Service, . . . " with alternative function doC( ). These in-line application-scope parameters respectively describe criteria that will be used for the evaluation of which of the doA( ), doB( ), or doC( ) will be executed at runtime.

The adaptable application 310 is packaged for deployment at a host 320. While the adaptable application system 300 illustrates a single host 320, embodiments of the present invention are not so limited and can included multiple hosts. Indeed, the conditional program flows may be conditioned on features of the particular host (or execution platform) executing the adaptable application 310.

A platform developer provides code selection logic (CODE_SELECTION_LOGIC) in the execution platform 322 on which the adaptable application 310 is deployed. The CODE_SELECTION_LOGIC defines the way in which the alternative functions doA( ), doB( ), and doC( ) will be executed at runtime. The platform developer can use (exploit) the in-line application developer hints included in the in-line application-scope parameters of the adaptable application logic 312 to construct the CODE SELECTION LOGIC. The CODE SELECTION LOGIC can be different for each host 320 and each deployment of the adaptable application 310.

The adaptable application 310 is able to interact with the CODE_SELECTION_LOGIC module in the execution platform 322 of the host 320 to execute the conditional program flows based on the CODE_SELECTION_LOGIC, the host configuration 324, and runtime states. That is, depending on the current conditions at runtime and the CODE_SELECTION_LOGIC, a particular one of the alternative functions doA( ); doB( ); or doC( ) is executed by the execution platform 322.

Figure 4:
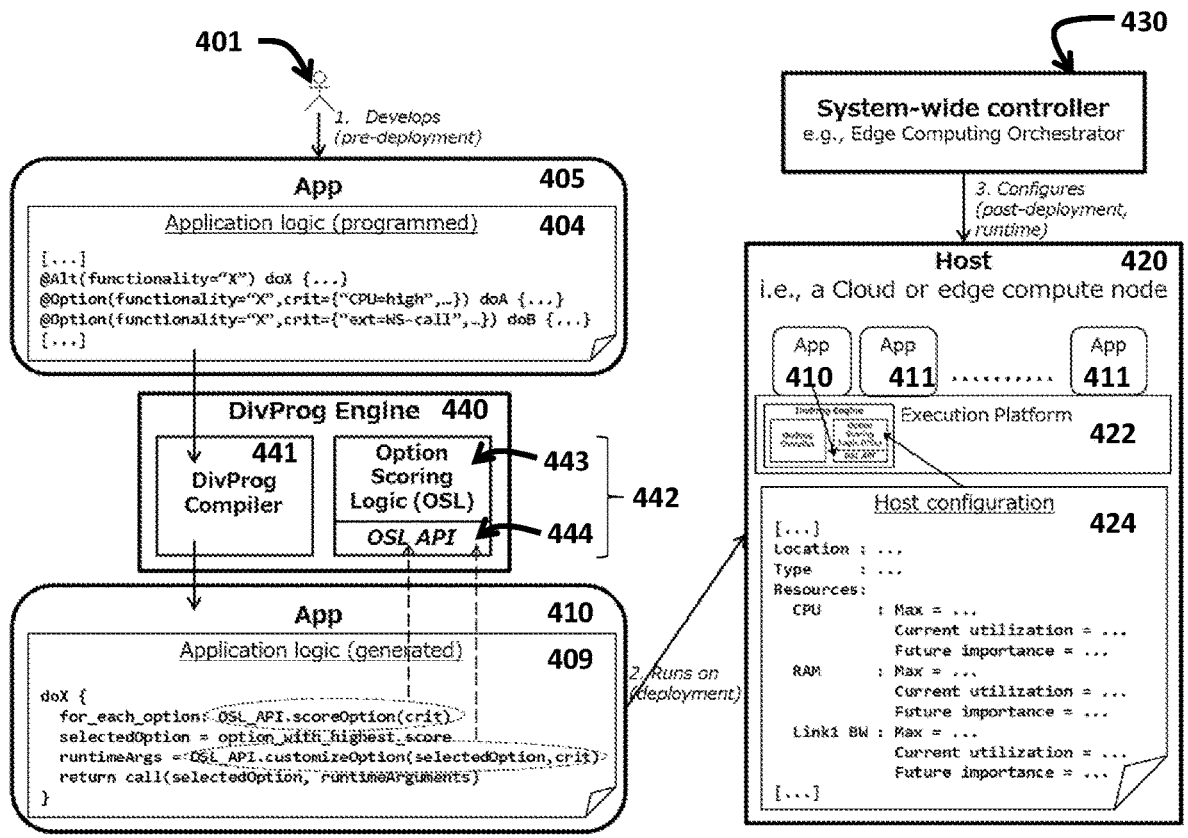
FIG. 4 illustrates a system and programming model that includes a DivProg Engine for developing adaptable applications according to an embodiment.

FIG. 4 illustrates an adaptable application system according to an embodiment. In FIG. 4, the adaptable application system 400 includes (is based on) an engine 440 (DivProg Engine) that can be used both by the application developer 401 and by the platform execution environment 422.

FIG. 4 illustrates, at a high-level, the engine 440 that has two main parts: a complier 441 and option scoring library 442.

The compiler 441 (DivProg Compiler) analyzes an input program and generates an output program that includes conditional statements. For example, the compiler 441 (DivProg Compiler) can analyze a programmed application 405, which is programed by the developer 401, and create a generated application 410 that contains all the required conditional statements. The application logic 404 of the programmed application 405 may be similar to the application logic 312 of the application 310 shown in FIG. 3.

In an embodiment, the programmed application 405 (input program), preferably its application logic 404, contains an abstract function (e.g., doX, here indicated by the @Alt annotation). The abstract function contains no implementation and is used at every position of the code where alternative program flows are possible. Each possible alternative flow, hereinafter called "option", is implemented in a separate function, which includes hints about the functionality that it implements (e.g., the same as doX) and some criteria for its selection or not (here indicated by the attributes of the @Option annotation).

The options are never called inside the programmed application 405 (input program) and there is also no selection logic (i.e., conditional statements) for selecting among the options. This aspect of embodiments provides that options can be added anytime into the programmed application 405 (input program) without the requirement to change any single line of the rest of the programed application logic 404 (input program code) for the new options to be available at runtime.

The generated application 410 (output program) is enriched by auto-generated implementations of all abstract functions (such as doX in FIG. 4). These implementations work as follows. For each option defined anywhere in the programmed application 405 (input program) that has the same functionality with the auto-generated function, a (functionality- and option-unaware) scoring function is called via an API (known only to the DivProg Compiler, but capable of having different implementations in each DivProg Engine instance depending on the embodiment). The option with the highest score (evaluated at runtime based on the provided developer hints and the runtime values of platform configuration parameters) is selected, customized, and called via an appropriate option invocation mechanism.

The option scoring library 442 includes option scoring logic (OSL) 443 and the OSL's API 444. The option scoring library 442 evaluates options in a generic way—that is without knowing anything about the functionality, the names, the logic, or the semantics of the options-based only on criteria provided as in-line function metadata (such as the attributes of the @Option annotation) and on runtime values of platform parameters.

For the option scoring library 442, the OSL API 444 is identical in all DivProg instances of the same system. The OSL 443 of an engine 440 (DivProg Engine) may (but is not required to) use all the metadata provided with an option when it computes the score of the option. The OSL 443 of each engine 442 (DivProg Engine) should assign higher scores to options that are more appropriate to use given the current runtime state. Each execution environment (e.g., execution platform 422) may have a different implementation of the OSL 443.

In some embodiments, the engine 440 (DivProg Engine) and the generated application 410 can be part of the host 420 (instead of the application developer's development environment as it is shown in FIG. 4). In this case the programmed application 405 is provided to the host 420 and the code generation using the engine 440 to create the generated application 430 happens at the host 420.

FIG. 4 illustrates an exemplary setting where the developer 401 provides a programmed application 405 that includes an abstract function doX, which is associated with in-line annotation @Alt. In this embodiment, the in-line annotation @Alt can be used by the DivProg Engine 440 to determine that doX is an abstract function. The in-line annotation @Alt can be written as an operation that defines additional meta-data parameters. In the example shown, the in-line annotation further defines: (functionality="x"), this information can be used by the DivProg Engine 440 to find alternative concrete functions that also correspond to the functionality x.

In this embodiment, alternative concrete functions are identified by the in-line annotation @Option. In FIG. 4, two alternative concrete functions are shown, doA and doB. Similar to above, the in-line annotation can further indicate the functionality associated with the concrete functions. Here, the in-line annotations state functionality="x". This identifies to the DivProg Engine 440 that doA and doB are options for the abstract functionality doX, because they all are tagged with the same functionality.

The in-line annotations of embodiments are not limited to identifying options and functionalities. For example, as shown in FIG. 4, the in-line annotations can indicate selection criteria, which can be used for indicating how to select from among the alternative concrete functions (e.g., at runtime). In the example shown, doA is associated with the in-line annotation crit={"CPU=high" ... } and doB with the in-line annotation crit={"ext=WS-call" ... }. These example annotations indicate to the DivProg Engine 440 that doA should be invoked at the runtime state where the CPU use is high and that doB should be invoked at the runtime state where there is a call from an external web service. It should be recognized that the in-line annotations are highly adaptable and are not limited to the examples shown here.

As shown in FIG. 4, the programmed application 405 (including the application logic containing in-line annotations) is received by the DivProg Compiler 441 of the DivProg engine 440. The DivProg Compiler 441 analyzes the programmed application 405 and generates the generated application 410, including the application logic 409. The DivProg Compiler 441 can use the option scoring library to determine the application logic 409.

The application logic 409 includes calls to the OSL API 441. These calls are invokable by the host 420 at runtime when the generate application 410 is deployed on the execution platform 422. The DivProg Engine 440 generates these calls based on in-line annotations, libraries, templates, etc.; they are not explicitly provided by the developer in the programmed application 405. In the example shown in FIG. 4, the DivProg Compiler 441, analyzed the application logic 404 and generated the application logic including the function doX that contains conditional statements for selecting from among doA and doB at runtime based on runtime states. For example, the generated application logic 409 includes a call to the OSL API 441 to determine a s score for each of the options doA and doB ("for_each_option: OSL_API.scoreOption(crit)"), here the variable passed by the call includes the criteria in-line annotation for each option. As shown in FIG. 4, the generated application logic 409 includes instructions to select from option doA and doB, the option with the highest score ("selectedOption=option with highest_score"). The embodiment also includes a call to the OSL API 444 for customizing the selected option based on runtime states ("runtimeArgs=OSL_API.cusomizeOption(selectedOption, crit)"), here the variables passed to the OSL API 444 include the selected option and runtime criteria. Finally, the generated application logic 409 will return as the function doX the selected option (doA or doB) as modified for runtime ("return call(selectedOption, runtimeArguments)").

According to embodiments, the option scoring library 442 can be different when implemented on the host 420 as compared to when implemented in the development environment, and can be different depending on which of a plurality of hosts deploying the generated application 410. The option scoring library 442 may receive values from the host configuration 424 to determine which of the alternative functionalities are invoked at runtime. For example, as shown in FIG. 4, a host configuration value associated with utilization of CPU resources may be used to select and invoke alternative functionality doA when the host is in a state where the CPU use is high.

In some embodiments, the generation of code that scans the possible options (as functions) and calls one of them (see also Option Invocation Mechanism discussed in connection with FIG. 5) is replaced by the usage of a framework that performs dynamic dependency injection (i.e., creates from the beginning instances of different classes that implement the same interface and uses each time the appropriate instance). In this embodiment, the selection of the appropriate instance is similarly done with the invocation of an OSL API as described above.

Figure 5:
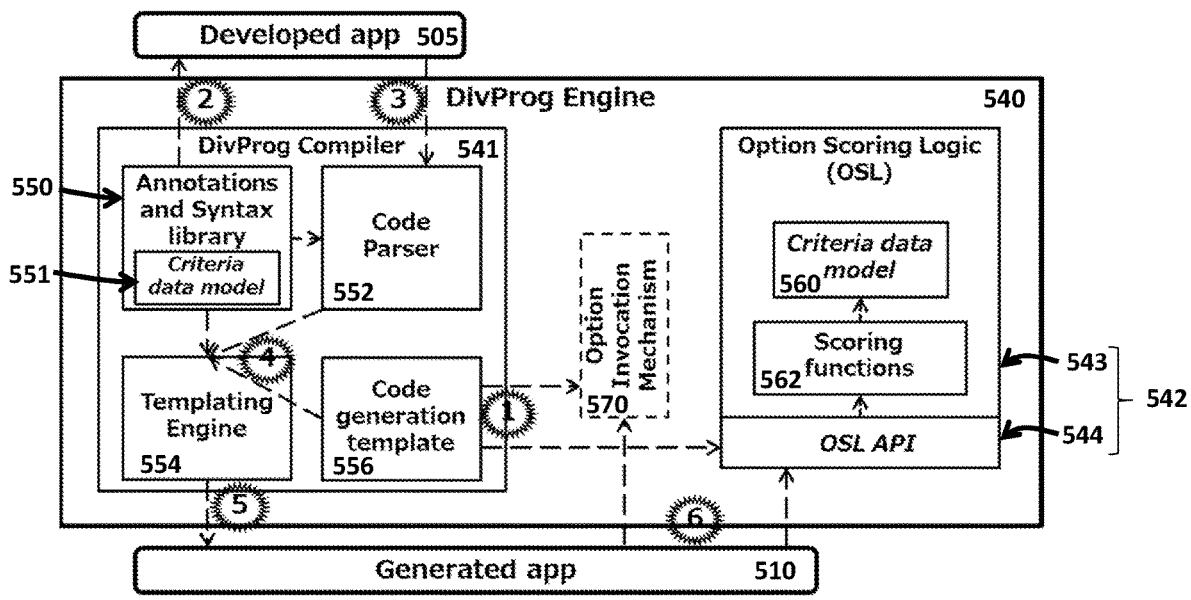
FIG. 5 illustrates a DivProg Engine according to an embodiment.

FIG. 5 illustrates an embodiment of a DivProg Engine and a method of its operation. The DivProg Engine of FIG. 5 is an embodiment of an engine described above in connection with FIG. 4.

The engine 540 (DivProg Engine) includes a compiler 541 (DivProg Compiler) and an option scoring library 542. The engine 540 receives a developed application 505 (input program), analyzes the developed application 505, and generates a generated application 510 (an output program) that includes conditional statements.

In embodiments, the compiler 541 (DivProg Compiler) includes an annotations and syntax library 550, a code parser 552, a templating engine 554, and a code generation template 556. The annotations and syntax library 550 may also include a criteria data model 551. In embodiments, the criteria data model 551 may include criteria parameters or settings used by the annotations and syntax library 550.

In embodiments, the option scoring library 542 includes option scoring logic (OSL) 543 and an OSL API 544. The OSL 543 may include a criteria data model 560 and scoring functions 562. The criteria data model 560, in embodiments, may include criteria parameters or settings used by the option scoring library 542 together with the logic or algorithms of the scoring functions 562 to provide a score.

In embodiments, the engine 540 (DivProg Engine) includes an option invocation mechanism (OIM) 570, that includes an OIM library.

FIG. 5 also indicates six operations (or steps or functionalities), Operation 1-6, performed by the engine 540.

At Operation 1, the engine 450 is instantiated with the code generation template 556 for the code that shall be auto-generated (generated application 510) based on the application developer code (developed application 505). The code generation template 556 may be permanent in the compiler 541. The "to-be-generated" code has references to an Option Invocation Mechanism (OIM) library associated with the OIM 570 (for the runtime invocation of the function that will be evaluated to be most appropriate) and the OSL API 544 (for finding the most appropriate function at runtime, based on host/platform logic).

In an embodiment, the OIM is reflection. Reflection is used in object-oriented programming for retrieving and using at runtime functions/methods that are not known at compile time. Reflection allows inspection of classes, interfaces, fields and methods at runtime without knowing the names of the interfaces, fields, methods at compile time. It also allows instantiation of new objects and invocation of methods.

In Operation 2, an application developer uses DivProg annotations and syntax to code functions that have multiple options and to describe criteria that will be used for the evaluation of the options at runtime. In embodiments, the implementations of the options are isolated from the rest of the code, which simply uses the name of the "generic" functionality at every position where the multi-option function shall be called.

In Operation 3, the developed application 505 is passed to the code parser 552 (DivProg Code Parser) for analyzing the multi-option functions.

In Operation 4, the parsing results of the code parser 552 (e.g., list of options, criteria, etc.) and at least one code generation template 556 are passed to the templating engine 554 (the templating engine 554 is a code generator).

In Operation 5, the code generation result of the templating engine 554 is packaged as the generated application 510 to be deployed on a host/PaaS.

In Operation 6, the generated application 510 includes auto-generated invocations to the OIM 570 and the OSL API 544. The invocations will take place at runtime, but against the OSL implementation of the host/PaaS, and not that of the development environment.

According to an embodiment, an implementation of a DivProg Engine may use Annotations @Alt, @Option (with various attributes) for specifying multi-option functionalities and their options, respectively. The DivProg Engine may also use Java Reflection as the OIM library. The DivProg Engine may also use Apache Velocity, a Java Annotation Processor, and a custom code generation program for implementing the code parser and the code generating templating engine.

As is readily understood from the provided description, embodiments of a system and programming model for developing adaptable applications may be used to implement a variety of software applications. For example, a diversifiable programming model (using a DivProg Engine of embodiments) can implement an application component that detects faces in an image. For such an application, the developer may have provided two different implementations for the face detection functionality: (1) an Open CV based implementation; and (2) a NeoFace based implementation. Here, the developer can include annotations with hints for use by the DivProg Engine to create a run-time adaptable face detection application. Below is an example of code implementing such an application:

```
package diversifiableProgramming;
import
diversifiableProgramming.diversifiableProgrammingSimpleTester.divProgImpl.detectFacesD
ivProgImpl;
public class diversifiableProgrammingSimpleTester {
    /**
     * Detects faces in an image.
     */
    @Alt(functionality="DetectFaces")
    public byte[ ][ ] DetectFaces(String imgName, double scale) {
        return detectFacesDivProgImpl.dpDetectFacesImpl(this, imgName, scale);
    }
    /**
     * Detects faces in an image using OpenCV implementation.
     * @param dynargs
     *     1. Name of dynamic parameter
     *     2. Min value of parameter
     *     3. Max value of parameter
     *     4. Step size
     *     5. Min value utility
     *     6. Mac value utility
     */
    @Option (functionality="DetectFaces", criteria={"prefSite=edge", "latency=2s",
    "nw=true", "security=procPrivateData"}, dynargs={"scale;480;800;20;10;50"})
    public byte[ ][ ] detectFacesOpenCV(String imgName, double scale) {
    }
    /**
     * Detects faces in an image using NeoFace implementation.
     */
    @Option(functionality="DetectFaces", criteria={"prefSite=edge", "latency=2s",
    "nw=false", "security=procPrivateData"}, dynargs={"scale;520;800;20;20;50"})
    public byte[ ][ ] detectFacesNeoFace(String imgName, double scale) {
    }
}
```

Figure 6:
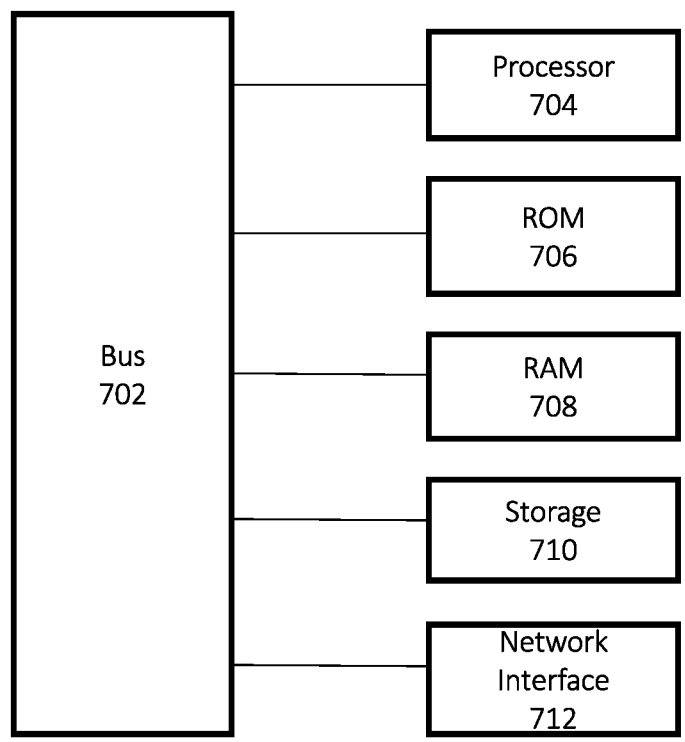
FIG. 6 illustrates is a block diagram of a processing system according to an embodiment.

FIG. 6 is a block diagram of a processing system according to one embodiment. The processing can be used to implement the protocols, devices, mechanism, systems and methods described above. The processing system includes a processor 704, such as a central processing unit (CPU) of the computing device or a dedicated special-purpose infotainment processor, executes computer executable instructions comprising embodiments of the system for performing the functions and methods described above. In embodiments, the computer executable instructions are locally stored and accessed from a non-transitory computer readable medium, such as storage 710, which may be a hard drive or flash drive. Read Only Memory (ROM) 706 includes computer executable instructions for initializing the processor 704, while the random-access memory (RAM) 708 is the main memory for loading and processing instructions executed by the processor 704. The network interface 712 may connect to a wired network or cellular network and to a local area network or wide area network, such as the Internet.

Embodiments of the present invention provide the introduction of programming syntax elements and annotations that allow for the definition and usage of multi-option functions in a way that the selection logic (for selecting among the options) is seamlessly exported from the application to the hosting platform.

Embodiments of the present invention provide a method for generating applications that can be seamlessly adapted at runtime. For example the applications can be forced to execute those options of their multi-option functions which are selected by logic of the hosting execution environment.

Methods of embodiments may include an engine that accepts (as its input) programs in which it is specified (in a machine-readable way) which (concrete) functions are options of which (abstract) functionality. The above information, together with hints about the implementation details or (conditional) performance features of each option, is provided by using programming language constructs (such as annotations) that are reserved for this purpose.

Methods of embodiments also provide an application development environment, including an engine which generates the executable version of the application, which includes code for searching at runtime among all available options, using an API for evaluating the options, and using an option invocation mechanism to call the option with the highest evaluation.

The auto-generated application executable being deployed to a host which includes (custom, host-specific) implementations of the functions of the aforementioned API, whereby said implementations use the hints provided by the developer along with any other host configuration parameters and custom host logic in order to evaluate options of multi-option functions.

The present invention provides advantages and improvements in the area of computer systems, particularly adaptable applications, and more particularly applications that are highly adaptable at runtime. An advantage of embodiments is that they provide a platform that has many options for adapting/configuring applications at runtime. This makes applications highly adaptable and capable of satisfying demanding application performance requirements (e.g., because a developer need not know all runtime states a priori). Another advantage of embodiments is that developers can implement the functionality with less code and simpler code as compared to implementing that same functionality with defined optional flow programs that are defined only pre-deployment or using AOP.

The present invention also provides a system where the adaptable code is easier to write and is cooperatively written by the application and the platform developer, which is in contrast to the complex approach offered by runtime code replacement.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A platform host for deploying a runtime adaptable application configured to perform a functionality, the application comprising a plurality of alternative functions for implementing the functionality, the platform host comprising one or more processors coupled to a non-transitory processor-readable storage medium having processor-executable instructions that, when executed by the one or more processors, cause the platform host to:
   with a compiler separate and distinct from the runtime adaptable application, automatically construct code selection logic for selecting between the plurality of alternative functions based on an analysis of their content;
   determine a runtime value of the platform, and with the constructed code selection logic, select one of the alternative functions based on the determined runtime value; and
   perform the functionality by executing the selected alternative function of the runtime adaptable application,
   wherein the content comprises non-executable application scope parameters that are based on one or more of syntax constructs and annotations;
   wherein the compiler is configured to:
   automatically construct executable code defining the code selection logic by analyzing the non-executable application scope parameters; and
   compile the executable code into the runtime adaptable application.

2. The platform host according to claim 1, wherein a combination of the code selection logic, and the values of the platform configuration parameters correspond to at least one runtime state.

3. The platform host according to claim 1,
   wherein, when executed by the one or more processors, the processor-executable instructions cause the platform host to execute the selected alternative function when the code selection logic detects a triggering runtime state based on values of platform configuration parameters.

4. The platform host according to claim 1, wherein, in an absence of the code selection logic constructed by the compiler, the platform host would be incapable of selecting between the plurality of alternative functions.

5. The platform host according to claim 1, wherein, the plurality of alternative functions are defined by code embedded within the application and the application lacks processor-executable logic for selecting between the plurality of alternative functions.

6. The platform host according to claim 1, wherein the code selection logic, once constructed, is embedded in a location external to the runtime adaptable application and the code selection logic comprises a separate call to each of the plurality of alternative functions.

7. The platform host according to claim 1, wherein the processor-executable instructions, when executed by the processor, cause the platform host to:
   with the compiler, analyze the runtime adaptable application; and
   with the compiler, automatically construct the code selection logic based on the analysis of the runtime adaptable application.

8. A system for a runtime adaptable application, the system comprising one or more processors and a non-transitory computer readable medium storing an engine comprising a compiler configured to:
   analyze an input program including multiple alternative functions all associated with a particular functionality and respective in-line function metadata associated with each of the alternative functions;
   automatically generate, based on the in-line function metadata, logic for selecting between the alternative functions and causing the selected alternative function to execute to perform the particular functionality; and
   package the multiple alternative functions and the selection logic into a runtime adaptable application, wherein the runtime adaptable application is based on the input program,
   wherein the engine further comprises an option scoring library configured to evaluate the alternative functions based on the in-line function metadata and determine a score for each of the alternative functions,
   wherein the compiler is configured to generate the runtime adaptable application with a call to the engine to determine how to implement the functionality based on the score for each of the alternative functions,
   wherein the compiler comprises a code generation template library having code for inclusion in the runtime adaptable application, the code having references to the option scoring library,
   wherein the engine further comprises an option invocation mechanism, which is configured to receive a call from a host executing the runtime adaptable application, and
   wherein the option scoring library is configured to select the option with a highest score, evaluated at runtime, based on the in-line function metadata and runtime values associated with a platform executing the runtime adaptable application.

9. The system according to claim 8, wherein the in-line function metadata comprises non-machine-readable developer comments respectively directed to each of the alternative functions.

10. The system according to claim 8, wherein the input program does not include calls to any of the plurality of alternative functions nor selection logic for selecting between the alternative functions.

11. The system according to claim 8, wherein the compiler is configured to determine whether to include a particular piece of code from the code generation template library in the runtime adaptable application based on the input program.

12. The system according to claim 11,
wherein the code of the code generation template library has references to the option invocation mechanism,
wherein the compiler is configured to generate the runtime adaptable application to include calls to at least one of the option invocation mechanism or the option scoring library,
and
wherein the engine is configured to determine the score of each of the alternative functions, select a function of the alternative functions having the highest score, and implement the function selected in response to receiving the call.

13. The system according to claim 8, wherein the compiler is configured select one of the alternative functions to implement the functionality using dynamic dependency injection.

14. The system according to claim 8, wherein the compiler comprises an annotations and syntax library which defines metadata for use as the in-line function metadata, the annotations and syntax library providing descriptions of criteria for use in evaluating the alternative functions at runtime.

15. The system according to claim 8, wherein the engine is part of an application developer's development environment.

16. The system according to claim 8, wherein the engine is part of a host, hosting an execution platform that is configured to execute the runtime adaptable application.

17. The system according to claim 8, wherein the engine is configured to score each of the alternative functions and generate the logic for selecting between the alternative functions based on the scores.

* * * * *